United States Patent [19]

Smith et al.

[11] 4,239,982
[45] Dec. 16, 1980

[54] FAULT-TOLERANT CLOCK SYSTEM

[75] Inventors: T. Basil Smith, Sudbury; John R. Howatt, Waltham; John F. McKenna, Jr., Gloucester, all of Mass.

[73] Assignee: The Charles Stark Draper Laboratory, Inc., Cambridge, Mass.

[21] Appl. No.: 915,469

[22] Filed: Jun. 14, 1978

[51] Int. Cl.³ .............................................. H03K 3/00
[52] U.S. Cl. ................................. 307/219; 307/269; 328/61; 328/62; 328/104
[58] Field of Search ................... 307/208, 219, 223 R, 307/269; 328/61, 62, 63, 70, 71, 74, 104, 105, 153, 154

[56] References Cited

U.S. PATENT DOCUMENTS

| | | | |
|---|---|---|---|
| 3,278,852 | 10/1966 | Mann | 328/60 |
| 3,479,603 | 11/1969 | Overstreet, Jr. | 307/219 X |
| 3,803,568 | 4/1974 | Higashide | 307/219 X |
| 3,900,741 | 8/1975 | Fletcher et al. | 307/219 X |
| 3,961,270 | 6/1976 | Ullmann et al. | 307/219 X |
| 4,019,143 | 4/1977 | Fallon et al. | 307/219 X |

*Primary Examiner*—John Zazworsky
*Attorney, Agent, or Firm*—Robert F. O'Connell

[57] ABSTRACT

A fault-tolerant clock system for providing digital timing signals (system clock signals) is provided by a plurality of clock sources. Each clock source receives as inputs the generated clock signals from all the other clock sources and contains receiver circuitry to derive a system clock signal from said clock sources which is the consensus clock signals of the other sources. Each clock source generates and distributes to the other clock sources a clock signal which is phase locked to the derived system clock from its clock receiver. In a system of $(2r+2)$ clock sources $(r+2)$ of them will remain phase locked to each other despite up to r clock source failures. Any clock receiver responsive to any $(2r+1)$ of the clock sources can therefore derive a correct system clock despite up to r clock source failures.

6 Claims, 5 Drawing Figures

FAULT-TOLERANT CLOCK SYSTEM

INTRODUCTION

This invention relates generally to clock systems for forming digital timing signals and, more particularly, to fault-tolerant systems utilizing a plurality of redundant timing sources for providing correct timing signals despite failure of one or more clock elements therein.

BACKGROUND OF THE INVENTION

Fault-tolerant clock systems using redundant clock sources have been available for providing timing signals in the face of the failure of one or more of the individual clock sources therein. Certain systems, such as shown in U.S. Pat. No. 3,479,603 issued on Nov. 18, 1969 to R. L. Overstreet, Jr., require relatively complex self-testing circuitry while other systems, such as shown in U.S. Pat. No. 3,278,852 issued on Oct. 11, 1966 to W. C. Mann, rely on a majority decision among redundant sources which, as arranged therein, could cause erroneous output pulses to be formed. Still other systems utilize the approach of detecting, isolating and correcting faults as they occur, a design which requires a determination of all failure modes prior to design thereby producing a complex and expensive system.

One reasonably successful system has also been described in U.S. Pat. No. 3,900,741 issued on Aug. 19, 1975 to Fletcher et al. Such system requires a total of (3r+1) clock elements to provide tolerance for r faults, where r is any positive integer.

It is desirable to reduce the number of redundant clock sources required for tolerating the same number of clock failures, thereby reducing the cost and complexity of the system, while still retaining the precision of control that is desired in applications in which the systems are used. Moreover, such systems should provide for convenient methods for compensating for circuit phase delays so that relatively high clock frequencies can be used.

Further, it is desirable that the jitter, which is present in most systems due to phase noise, be capable of being minimized.

The system discussed in the above Fletcher et al patent suffers from the above problems and, moreover, utilizes fixed delay elements therein so that a high degree of frequency control precision is difficult to achieve.

SUMMARY OF THE INVENTION

The system of the present invention permits high clock frequencies to be used with a minimum of jitter, while permitting a significantly greater precision in frequency control to be achieved. Moreover, the system of the invention can generally tolerate r clock source failures when utilizing only (2r+2) redundant clock sources.

In accordance with the invention, each clock source comprises a clock receiver and a clock generator. In each clock source, a clock receiver accepts the (2r+1) clock signals from the other clock sources and derives a system clock signal at its output which is identical in frequency with a consensus of these (2r+1) clock signals and which has a phase differing from the consensus by the clock receiver circuitry's internal phase delay. The consensus of (2r+1) clock signals is only defined when r+1 of the clock signals are unfailed, that is when r+1 of the clock signals are of the same frequency and when the maximum phase difference between two of the unfailed clock signals, $\Delta\phi_m$, is smaller than an allowable phase difference, $\Delta\phi_a$. A consensus clock is then defined as any clock signal with the same frequency as the unfailed clocks and whose phase differs by no more than $\Delta\phi_m$ from any of the unfailed clocks.

The clock generator of each clock utilizes a voltage controlled oscillator for generating a clock signal for distribution to all other clock sources of the system. The output of the voltage controlled oscillator is also delayed by an appropriate delay means which is adjusted so that the derived system clock signal from the clock receiver is in phase with the delayed clock signal from the voltage controlled oscillator when the distributed clock signal from the clock source is in phase with the distributed clock signals from the other clock sources. A phase-locked loop circuit compares the phase of the derived clock signal with the phase of the delayed clock signal from the voltage controlled oscillator and locks the two into phase synchronism, thereby effectively locking the distributed clock to the other system clocks. The phase-locked loop uses appropriate low pass filtering and biasing to provide the control signal for the voltage control oscillator.

The system of the invention can tolerate up to r clock generator failures in the (2r+2) clock generators and with such restriction any functioning (i.e., nonfailed) clock receiver is still capable of deriving a correct system clock signal.

DESCRIPTION OF THE INVENTION

Figure 1:
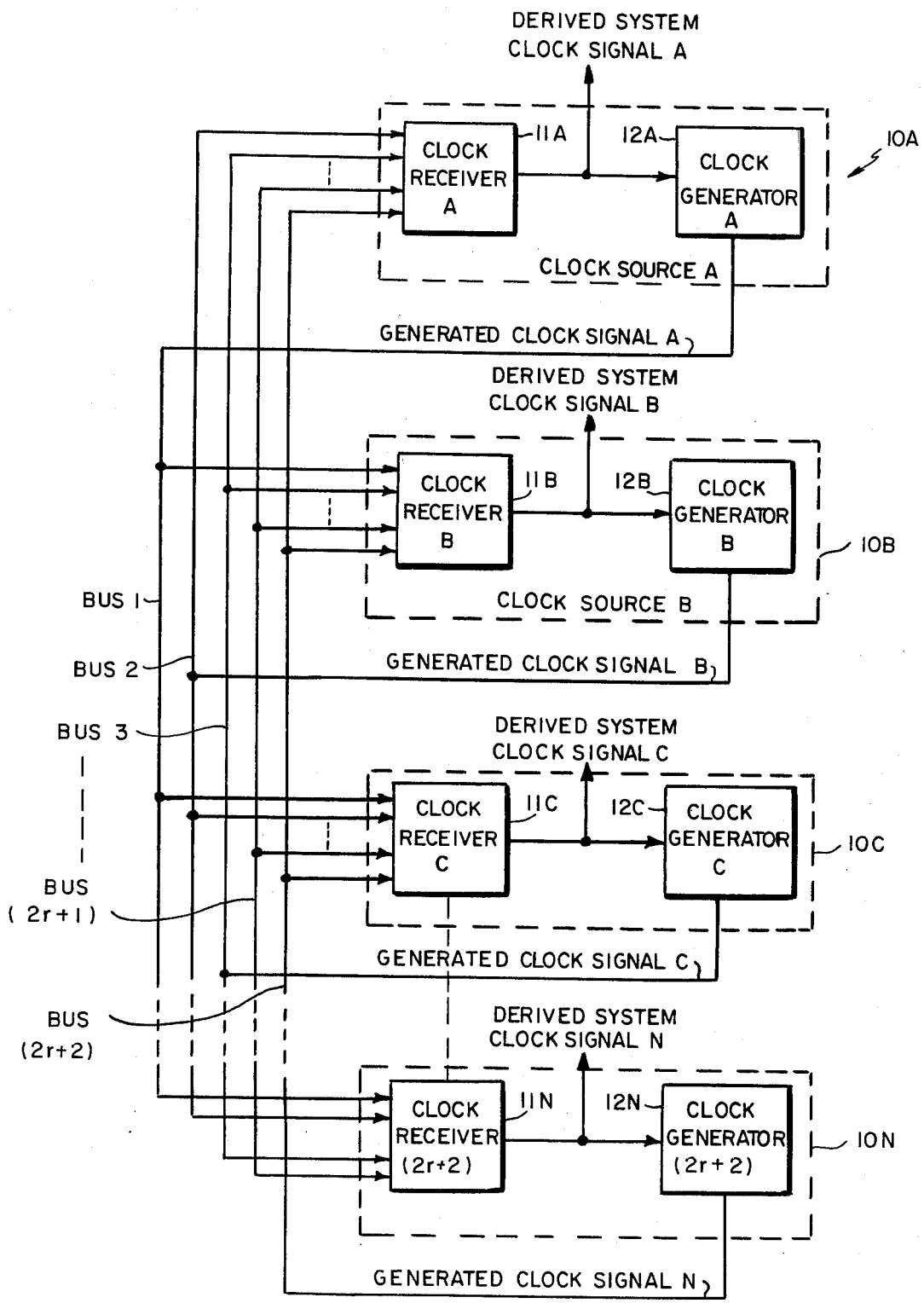
FIG. 1 shows a block diagram of a preferred embodiment of a fault tolerant clock system in accordance with the invention.

As can be seen in FIG. 1, a system clock signal source in accordance with the invention comprises a plurality of redundant clock sources, or elements, 10A, 10B, 10C, ... 10N, where N=(2r+2). Each such source includes a clock receiver 11A, 11B, 11C ... 11N and a clock generator 12A, 12B, 12C ... 12N. The clock receiver in each case is responsive to each of the (2r+1) other clock signals generated by each of the other clock generators. Each clock source 10 derives a system clock signal which is identical in frequency with the consensus of the (2r+1) clock sources to which it is responsive. The phase of each of such derived system clock signals is shifted from the phase of the consensus of the input signals by the clock receiver circuit elements internal delay. The clock signals produced by each of the clock generators are maintained in an appropriate phase relationship with the associated derived system clock of the corresponding clock receiver so that the generated clock signal from each generator is in phase with the clock signals of the other generators.

In accordance with the system shown in FIG. 1, when (2r+2) clock sources are utilized, a failure of r clock sources will still permit the derivation of a correct system clock signal from each of the remaining functioning clock sources.

Figure 2:
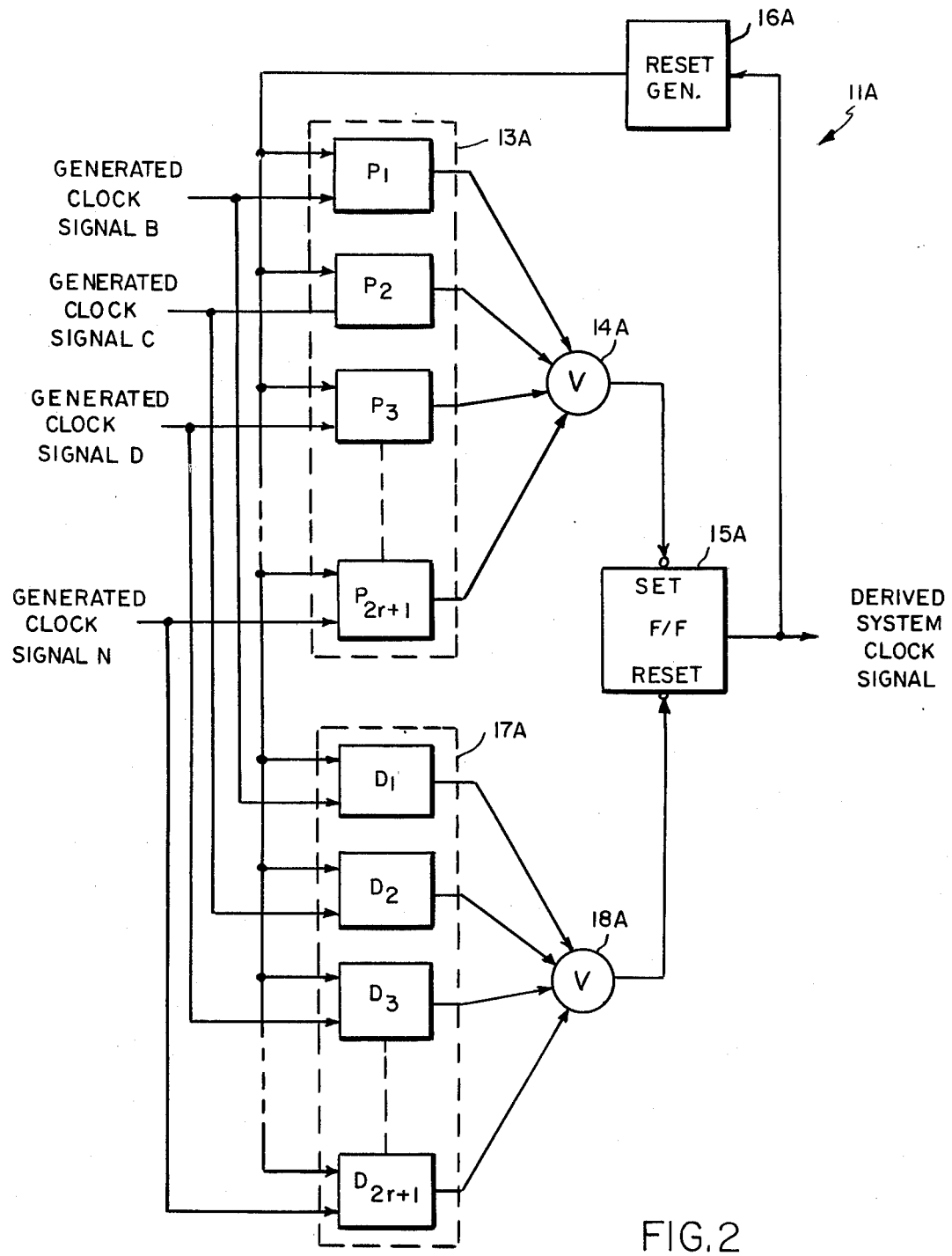
FIG. 2 shows a block diagram of an exemplary clock receiver for use in the clock sources of the system shown in FIG. 1.

The structure and operation of each of the clock receivers is shown by the exemplary clock receiver circuitry 11A in FIG. 2. As can be seen therein, clock receiver 11A is responsive to clock signals from each of the other clock sources (i.e., clock signal B, clock signal C, clock signal D, . . . clock signal N). Each of such signals are supplied to one input of each of $(2r+1)$ rising-edge detector circuits 13A identified as $P_1, P_2, P_3, \ldots P_{2r+1}$. A second input of each of said rising-edge detectors is a reset signal from a reset generator 16A as described below. Rising-edge detectors 13A monitor the $(2r+1)$ input clock signals to determine their rising edges. The outputs of such rising-edge detectors provide appropriate input signals to a voter circuit 14A when edges are detected and latched.

When $(r+1)$ of the $(2r+1)$ rising-edge detectors 13A have latched, voter circuit 14A detects such condition and the output signal therefrom sets an R-S flip-flop circuit 15A, thereby causing the receiver circuit output from the flip-flop circuit, i.e., the derived system clock signal, to rise. The rising derived system clock signal actuates the reset generator to provide an appropriate reset signal to rising-edge detectors 13A so as to disable such detectors and to reset them to zero.

The reset generator signal is utilized to enable the $(2r+1)$ falling-edge detector circuits 17A, identified as $D_1, D_2, D_3, \ldots D_{2r+1}$. In a similar manner when $(r+1)$ falling edges of the $(2r+1)$ input clock signals have been detected by a voter circuit 18A, the flip-flop circuit 15A is reset thereby causing the system clock signal to fall. The falling system clock signal thereby actuates the reset generator 16A to change the state of its output signal such as to disable falling-edge detectors 17A, resetting them to zero, and to enable the rising-edge detectors 13A, thus thereby completing the overall cycle. Such a clock receiver will derive a suitable version of the system clock so long as $(r+1)$ or fewer of the $(2r+1)$ clocks remain unfailed, i.e., so long as no more than $r$ clock sources of the total $(2r+2)$ clocks have failed.

Figure 3:
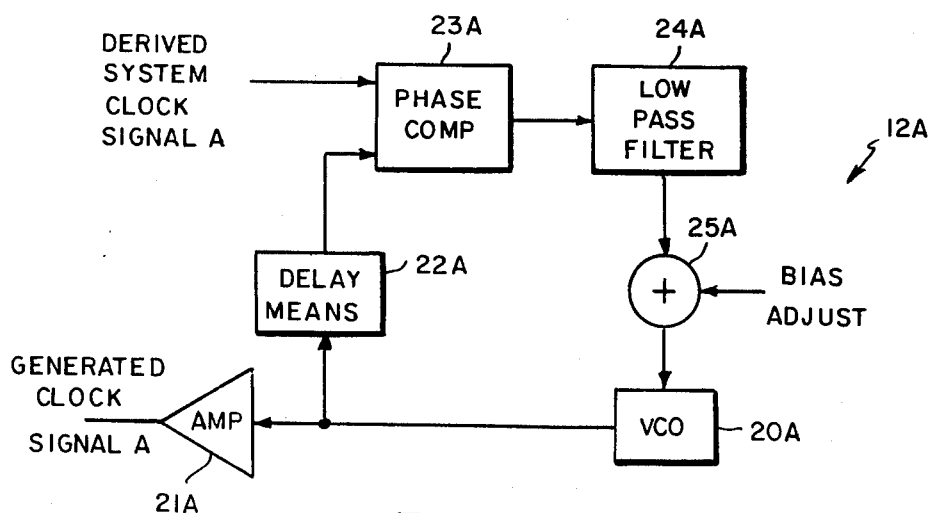
FIG. 3 shows a block diagram of an exemplary clock generator for use in the clock sources of the system shown in FIG. 1.

An exemplary embodiment of a clock generator 12A of clock source 10A shown in FIG. 3. As can be seen, the clock generator is a phase-locked loop which utilizes a voltage controlled oscillator (VCO) 20A the output of which provides a clock signal A which is distributed via amplifier 21A to the remaining clock sources. The output of VCO 20A is delayed by a suitable delay means 22A. The delay of delay means 22A is adjusted so that the system clock signal derived by the clock receiver is in phase with the delayed clock signal from VCO 20A at the output of delay means 22A when the distributed clock signal A is in phase with the distributed clock signals from the other clock sources. A phase comparator 23A is responsive to the derived system clock signal and to the delayed VCO clock signal and compares the phases thereof to generate an error signal which is indicative of the phase error between the VCO output clock signal A which is being distributed and the other $(2r+1)$ clock signals which are being processed by the clock receiver of clock source A. The error signal output is thereupon appropriately filtered by low pass filter 24A and, following a suitable bias adjustment by bias adjustment device 25A is used to provide a control signal for driving VCO 20A. The DC gain of low pass filter 24A is suitably selected so as to be sufficiently great to drive the error signal to a small value but not so great as to force each of the VCO's within the clock generators to operated beyond their desired operating ranges due to phase errors which may arise at the detector because of small unavoidable variations in the phase delay of the various clock receivers 11, delay means 22, and isolation amplifiers 21. The choice of the gain of low pass filter 24A, therefore, becomes generally dependent on the characteristics of the VCO which is selected for use and on the overall system requirements.

The system of FIG. 1 utilizing a plurality of clock sources having a clock receiver and clock generators of the type shown in FIGS. 2 and 3, can tolerate up to $r$ clock generator failures of the total $(2r+2)$ clock generators thereof and under such conditions any functioning clock receiver is still able to derive a correct system clock signal.

Figure 4:
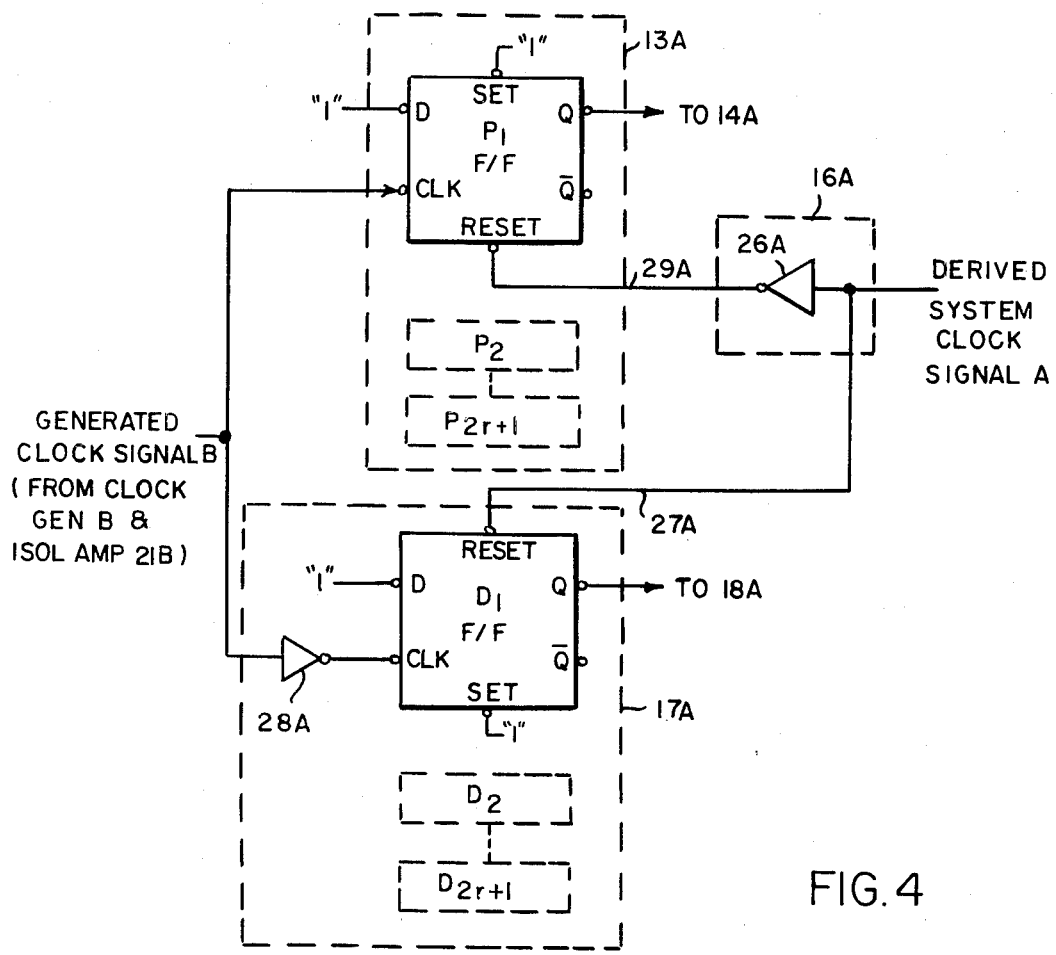
FIG. 4 shows a more specific circuit diagram of a portion of the clock receiver shown in FIG. 2.

FIG. 4 shows a specific circuit implementation of a portion of the receiver circuitry of FIG. 2. The derived system clock signal A is provided as an input to reset generator 16A which comprises an inverter 26A whose output 29A is provided to the "reset" terminal of rising edge detectors $P_1 - P_{2r+1}$. The detectors P are typically edge triggered latching flip-flop circuits, such as a type D flip-flop available in integrated circuit form as a dual D flip-flop, National Semiconductor type 7474. The other output 27A of reset generator 16A is provided to the "reset" terminal of falling edge detectors $D_1 - D_{2r+1}$ each of which are typically the other half of the dual D flip-flops. Because of the inverter 26A, it is seen that the latching flip-flops P will be enabled when the derived system clock signal A is high, whereas the latching flip-flops D will be enabled when the derived system clock signal A is low. Isolation amplifier 21B of clock generator B provides clock signal B directly to the "clock" input terminal of latch flip-flop $P_1$ which is sensitive to rising edges. This clock signal is inverted in inverter 28A before being applied to the "clock" input terminal of the latch flip-flop $D_1$. The combination of inverter and flip-flop is sensitive to falling edges. The "set" and "D" inputs of the flip-flops $D_1$ and $P_1$ have a high or "one" input continuously applied as shown. The outputs of the $P_1$ and $D_1$ latching flip-flops are obtained from their "Q" output terminals and provided as an input to the voting circuits 14A and 18A, respectively. The latching flip-flops $P_2-P_{2r+1}$ and $D_2-D_{2r+1}$ of FIG. 4, are connected in the same manner as latching flip-flops $P_1$ and $D_1$. Their clock inputs are connected to generated clock signals "C"–"N" and their "Q" outputs connected as inputs to the voting circuits 14A, 18A, respectively, as shown in the block diagram of FIG. 2.

The voting circuits 14A and 18A, and the set-reset flip-flop 15A of FIG. 2 are not shown on FIG. 4. A voting circuit 14, 18 may be implemented by using a majority logic gate. A specific example of such implementation would be National Semiconductor type MC 14530 dual 5 input majority logic gate. Flip-flop 15A is a conventional set-reset flip flop.

It is evident that those skilled in the art, once given the benefit of the foregoing disclosure, may make numerous other uses and modifications of, and departures from the specific embodiments described herein without departing from the inventive concepts. Consequently, the invention is to be construed as embracing each and every novel combination of features present in, or possessed by, the apparatus and techniques therein disclosed and limited solely by the scope and spirit of the appended claims.

Figure 5:
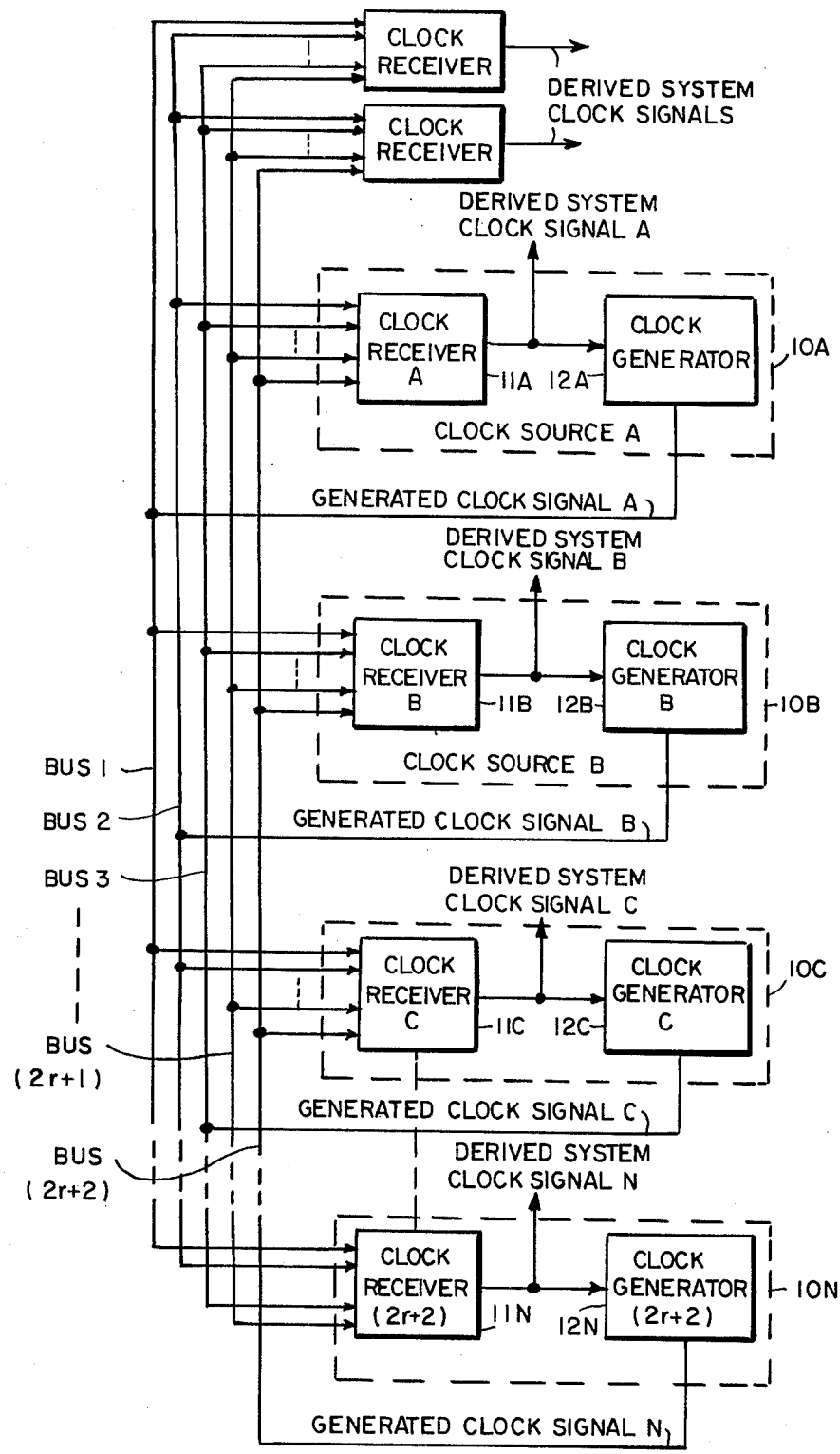
FIG. 5 shows a block diagram of the clock system with fewer clock generators than derived system clocks.

A specific modification envisioned of the system of FIG. 1 is the distribution of the (2r+2) generated clock signals to a plurality of independent clock receivers as shown in FIG. 5 of the type incorporated within the clock sources for the purposes of deriving correct system clock signals separately or remotely from the clock sources despite r failures of the clock sources.

What is claimed is:

1. A fault-tolerant clock system which provides for correct derivation of system clock signals from a plurality of (2r+2) clock sources despite r failures of individual clock sources, where r is a positive integer, said system comprising, a plurality of (2r+2) clock signal sources, each clock signal source comprising a clock receiver for providing a derived system clock signal and a clock generator for providing a generated clock signal, each said clock receiver being responsive to the (2r+1) generated clock signals of only the other (2r+1) of said (2r+2) clock sources for providing a derived system clock signal having only the frequency components of the clock signals of the unfailed clock sources of said (2r+1) clock sources and which is in phase with the unfailed clock sources, each of said clock generators being responsive to the derived system clock signal from its respective receiver for producing a generated clock signal which is presented to the clock receivers of the other said clock sources, said generator being synchronized to the same frequency and phase as its derived system clock signal input.

2. A fault-tolerant clock system of claim 1 wherein said system additionally includes, a second plurality of clock receivers for providing derived system clock signals separately from any of the system clock sources, each of said clock receivers of said second plurality being supplied with and responsive to any (2r+1) of the (2r+2) generated clock signals of the (2r+2) clock sources.

3. The fault-tolerant clock system of claim 1 wherein each said clock receiver comprises a plurality of leading edge and trailing edge detectors, a first and second majority logic circuit, a flip-flop circuit, each of said leading edge detectors being responsive to a different generated clock signal of the other (2r+1) of said (2r+2) clock sources and being disabled and driven to a first output state when the derived system clock of its generator is high and enabled when the derived system clock is low such that it will be driven to its second output state in response to the leading edge of the associated generated clock signal, each of said leading edge detectors having their outputs connected as the inputs to said first majority logic circuit, each of said trailing edge detectors being responsive to a different generated clock signal of the other (2r+1) of said (2r+2) clock sources and being disabled and driven to a first output state when the derived system clock of its generator is low and enabled when the derived system clock is high such that it will be driven to its second output state in response to the trailing edge of the associated generated clock signal, each of said trailing edge detectors having their outputs connected as the inputs to said second majority logic circuit, the output states of said first and second majority logic circuits being responsive to the input state of the majority of their respective inputs, the outputs of said first and second majority circuits being provided as "set" and "reset" signals, respectively, to said flip-flop circuit whose output provides the derived system clock signal of said clock source.

4. The fault tolerant clock system of claim 3 wherein said first and second plurality of edge detectors comprise a first and second plurality of flip-flop circuits, a plurality of inverters, each of said first flip-flop circuits having its "reset" input connected through a different one of said inverters to said derived system clock signal of the clock source, the "reset" input of said second plurality of flip-flop circuits being connected directly to the derived system clock signal of said clock source, the "clock" input of said first plurality of flip-flop circuits being connected to a different one of the generated clock signals from the other 2r+1 clock sources respectively, the "clock" terminal of said second plurality of flip-flop circuits being connected through a different one of said inverters to said generated clock signals from each of said other 2r+1 clock sources respectively, the corresponding output terminal of said first plurality of flip-flop circuits being connected to said first majority logic circuit, and corresponding output terminal of said second plurality of flip-flop circuits being applied as inputs to said second majority logic circuit.

5. The fault-tolerant clock system of claim 1 wherein each said clock generator comprises a phase-locked loop which further comprises a phase comparator, a low pass filter, a voltage controlled oscillator, and a delay means, said phase comparator having as one input the derived system clock signal provided by the clock receiver of its respective clock signal source, said phase comparator having another input connected through said delay means to the output of said voltage controlled oscillator, the output of said phase comparator being provided through said low pass filter to an input of said voltage controlled oscillator, the output of said voltage controlled oscillator being the output of its respective clock generator and providing a generated clock signal output from its respective clock signal source.

6. A fault-tolerant clock system which provides for correct derivation of the system clock signal from a plurality of (2r+2) clock sources despite r failures of individual clock sources, where r is a positive integer, said system comprising, a plurality of (2r+2) clock signal sources, each clock source comprising a clock receiver for deriving a system clock signal and a clock generator for providing a generated clock signal, each said clock receiver being responsive to the (2r+1) generated clock signals of only the other (2r+1) of said (2r+2) clock signal sources for providing a derived system clock signal, each clock receiver comprising, a plurality of (2r+1) first means each responsive to one output state of the derived system clock signal of its respective clock source to provide one output state from each of said first means, each of said first means also responsive to only the first rising edge of a different one of said (2r+1) generated signals occurring after said one output state of said derived system clock to provide from each first means a second output state, a plurality of (2r+1) second means each responsive to another output state of said derived system clock signal of its respective clock source to provide another output state from each of said second means, each of said second means also responsive to only the first falling edge of a different one of said (2r+1) generated signals occurring after said another output state of said derived system clock to provide from each second means a first output state, a first and second majority circuit, the output of each first means being applied as an input to said first majority circuit to provide one output state when a majority of said first means outputs are in a one state, the output of each second means being applied as an input to said second majority circuit to provide one output state when a majority of said second means outputs are in a one state, means responsive to the outputs of said first and second majority circuits to provide an output of one state when said first majority circuit has an output of said one state and to provide an output having another state when said second majority circuit has an output of said one state, said responsive means output providing said derived system clock from said clock receiver, each of said clock generators being responsive to a derived system clock signal from its associated clock receiver for producing a generated clock signal which is provided to the clock receivers of the others of said clock sources.

* * * * *